United States Patent
Young

(10) Patent No.: US 9,715,213 B1
(45) Date of Patent: Jul. 25, 2017

(54) VIRTUAL CHESS TABLE

(71) Applicant: Dennis Young, Kansas City, MO (US)

(72) Inventor: Dennis Young, Kansas City, MO (US)

( * ) Notice: Subject to any disclaimer, the term of this patent is extended or adjusted under 35 U.S.C. 154(b) by 218 days.

(21) Appl. No.: 14/666,417

(22) Filed: Mar. 24, 2015

(51) Int. Cl.
| | | |
|---|---|---|
| A63F 9/24 | (2006.01) | |
| G03H 1/00 | (2006.01) | |
| G03H 1/22 | (2006.01) | |
| A63F 3/02 | (2006.01) | |

(52) U.S. Cl.
CPC ............ *G03H 1/0005* (2013.01); *A63F 3/02* (2013.01); *G03H 1/2202* (2013.01); *G03H 1/2249* (2013.01); *G03H 2001/0061* (2013.01); *G03H 2001/2284* (2013.01)

(58) Field of Classification Search
CPC ................................ A63F 3/02; G03H 1/0005
See application file for complete search history.

(56) References Cited

U.S. PATENT DOCUMENTS

| | | |
|---|---|---|
| 3,654,392 A | 4/1972 | Beinhocker |
| 3,888,491 A | 6/1975 | Bernard |
| 4,082,285 A | 4/1978 | Bathurst |
| D254,626 S | 4/1980 | Bialek |
| 4,235,442 A | 11/1980 | Nelson |
| 4,279,421 A | 7/1981 | Tepoorten |
| D272,919 S | 3/1984 | Chambers |
| 5,462,281 A | 10/1995 | Gaito |
| 6,926,278 B2 | 8/2005 | Bibi |
| 8,087,672 B2 | 1/2012 | Malobabic |
| 2006/0118634 A1* | 6/2006 | Blythe ............... G06K 7/14 235/462.15 |
| 2011/0243380 A1* | 10/2011 | Forutanpour ........... G06F 3/017 382/103 |
| 2011/0292167 A1* | 12/2011 | Altieri .................. G06Q 30/02 348/40 |
| 2014/0160162 A1* | 6/2014 | Balachandreswaran G03B 17/54 345/633 |
| 2014/0267599 A1* | 9/2014 | Drouin ................. G03H 1/2294 348/41 |
| 2015/0065221 A1* | 3/2015 | Liping ................. G03H 1/2294 463/14 |

FOREIGN PATENT DOCUMENTS

FR  2625344 A1  5/1998

* cited by examiner

*Primary Examiner* — Steve Rowland
(74) *Attorney, Agent, or Firm* — Kyle A. Fletcher, Esq.

(57) ABSTRACT

The virtual chess table includes a table that includes a touch screen and joystick on opposing sides of the table. The touch screen and joystick are each used by competing players in order to play a game chess. The table includes a pane of glass that encloses an image projector there under. The image projector is used to generate a chessboard on the pane of glass. A hologram projector system is included and is suspended above the table. The hologram projector system is used to create a three-dimension hologram of the chess pieces used to play the game of chess. The hologram projector system and the image projector are in wired connection with a computer located underneath the table. The computer is also in wire connection with the touch screen and joystick provided at opposing sides of the table.

16 Claims, 6 Drawing Sheets

VIRTUAL CHESS TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of chess tables and sets, more specifically, a chess table that utilizes hologram projectors to create a virtual chess game.

SUMMARY OF THE INVENTION

An embodiment of the disclosure meets the needs presented above by generally comprising a table that includes a touch screen and joystick on opposing sides of the table. The touch screen and joystick are each used by competing players in order to play a game chess. The table includes a pane of glass that encloses an image projector there under. The image projector is used to generate a chessboard on the pane of glass. A hologram projector system is included and is suspended above the table. The hologram projector system is used to create a three-dimension hologram of the chess pieces used to play the game of in wired connection with a computer located underneath the table. The computer is also in wire connection with the touch screen and joystick provided at opposing sides of the table. The computer is responsible for relaying information from the joysticks and the touch screen to the image projector as well as the hologram projector system in order to create a virtual game of chess.

These together with additional objects, features and advantages of the virtual chess table will be readily apparent to those of ordinary skill in the art upon reading the following detailed description of presently preferred, but nonetheless illustrative, embodiments of the virtual chess table when taken in conjunction with the accompanying drawings.

In this respect, before explaining the current embodiments of the virtual chess table in detail, it is to be understood that the virtual chess table is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the virtual chess table.

It is therefore important that the claims be regarded as including such equivalent construction insofar as they do not depart from the spirit and scope of the virtual chess table. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
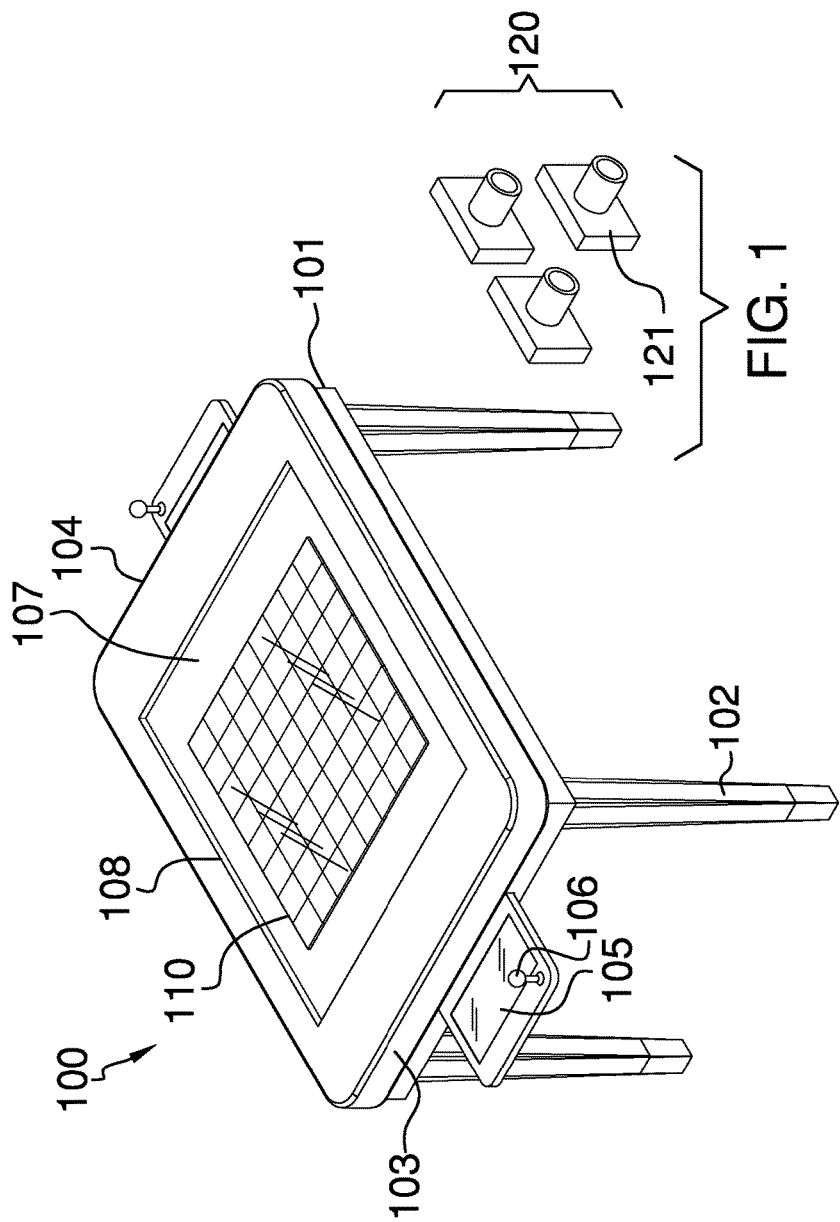
FIG. 1 is a perspective view of an embodiment of the disclosure.
Figure 2:
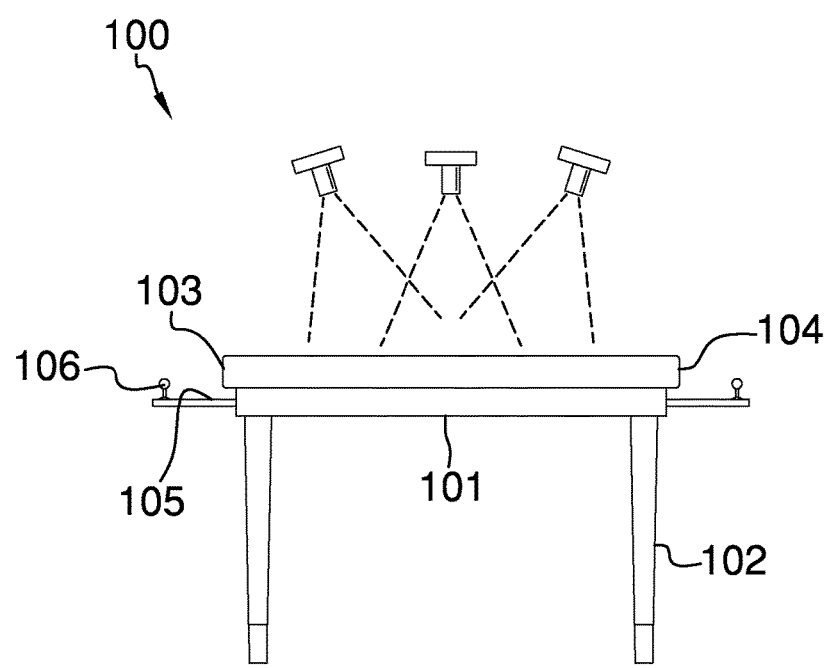
FIG. 2 is a side view of an embodiment of the disclosure.
Figure 3:
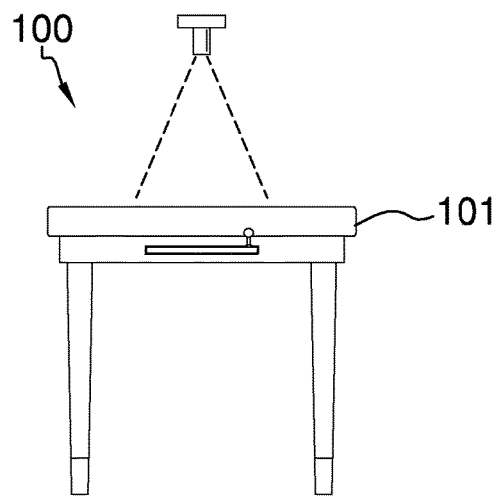
FIG. 3 is an end view of an embodiment of the disclosure.
Figure 4:
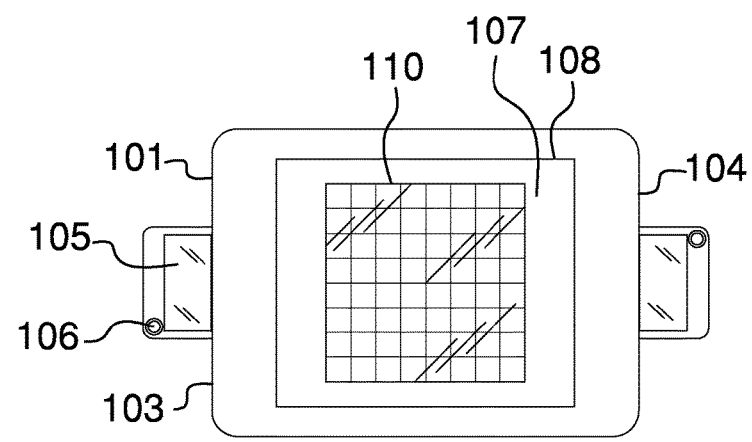
FIG. 4 is a top view of an embodiment of the disclosure.
Figure 5:
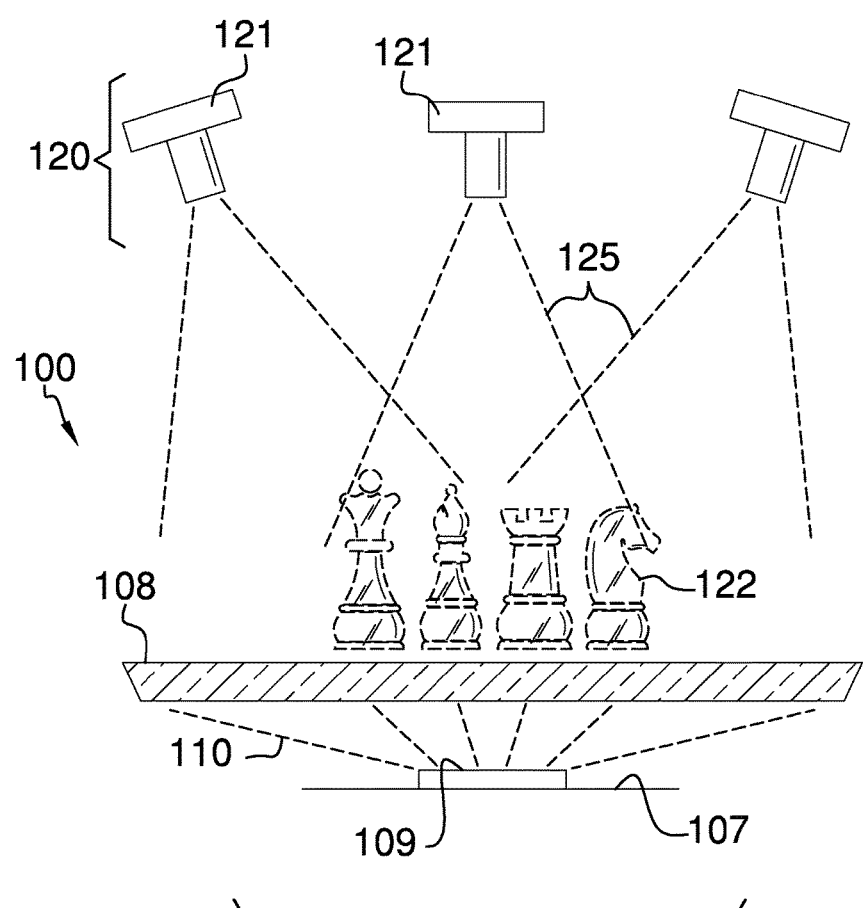
FIG. 5 is a detail view of an aspect of an embodiment of the disclosure.
Figure 6:
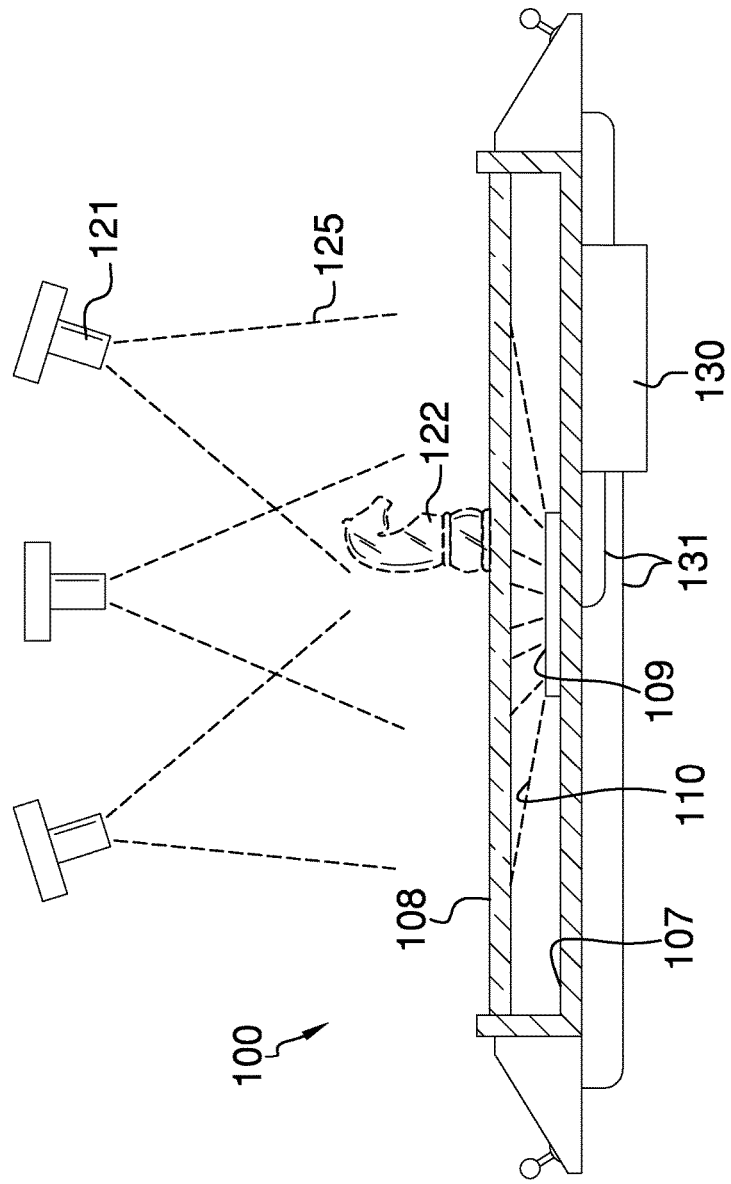
FIG. 6 is another detail view of an aspect of an embodiment of the disclosure.
Figure 7:
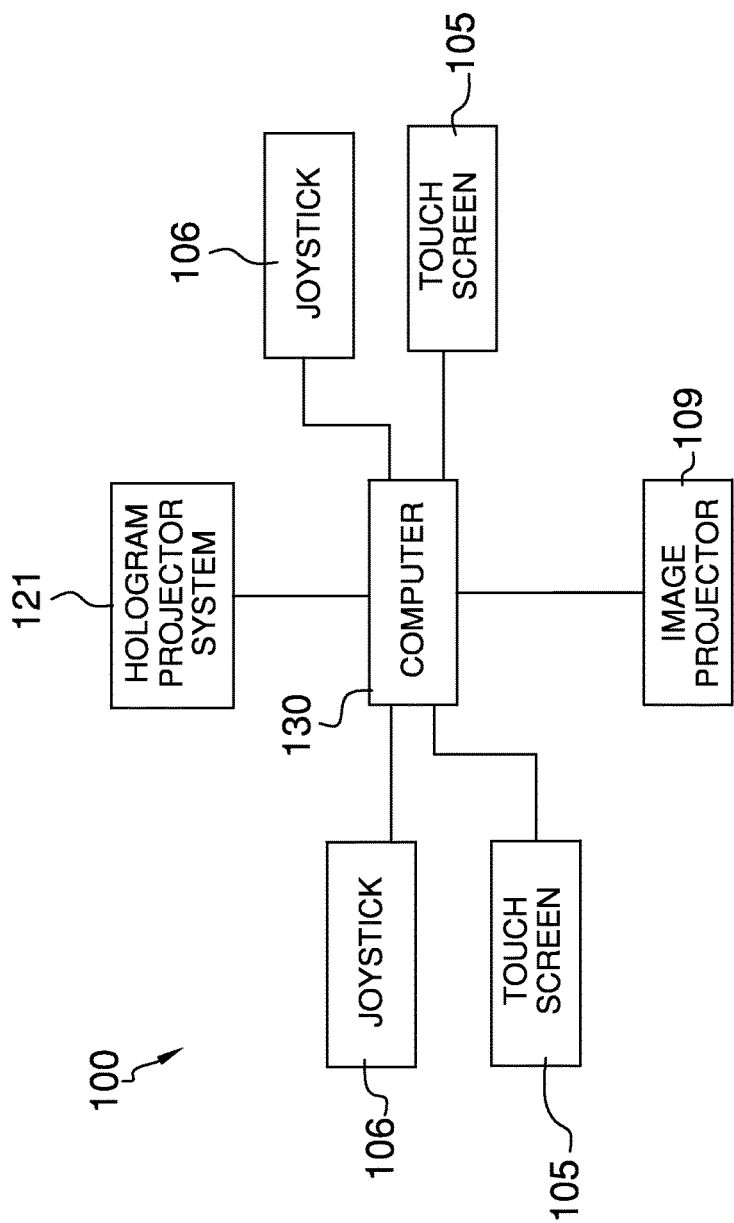
FIG. 7 is a block diagram of the components associated with an embodiment of the disclosure.

As best illustrated in FIGS. 1 through 7, the virtual chess table 100 (hereinafter invention) generally comprises a table 101 that includes at least one leg 102 that supports the table 101 in a horizontal orientation. The table 101 is further defined with a first side 103 and a second side 104. The first side 103 is opposite of the second side 104. Both the first side 103 and the second side 104 include a touchscreen 105 and a joystick 106.

The table 101 is further defined with a recess 107 that is covered with a glass member 108. The recess 107 includes an image projector 109 that projects an image 110 onto the glass member 108. The image 110 consists of a chessboard that is provided on the glass member 108.

A hologram projector system 120 is included and is suspended above the table 101. Moreover, the hologram projector system 120 includes a plurality of hologram projectors 121 that are suspended at various locales around the table 101. The technology behind the hologram projector system 120 is known in the art. The plurality of hologram projectors 121 each emit a laser light 125 that intersects with one another to form a holographic image 122. In the case of the invention 100 at bar, the plurality of hologram projectors 121 shall create one or more holographic images 122 of chess pieces, which are to be moved about and above the image 110 presenting the chessboard in order to replicate a virtual version of a game of chess.

The hologram projector system 120 and the image projector 109 connect to a computer 130 via wiring 131. The computer 130 is located underneath the table 101, and is also in wired connection via wiring 131 with the touchscreen 105 and the joystick 106 of the first side 103 and the second side 104 of the table 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A virtual chess table comprising:
a table that includes an image projector that emits an image of a chessboard onto a glass member;
wherein a virtual projector system is suspended above said table and projects a three-dimensional hologram of one or more chess pieces that are manipulated about said image of said chessboard;
wherein a pair of opposing sides of the table include a joystick and a touchscreen that communicates with a computer to manipulate the three-dimensional hologram of said one or more chess pieces.

2. The virtual chess table according to claim 1 wherein the table includes at least one leg that supports the table in a horizontal orientation.

3. The virtual chess table according to claim 2 wherein the table is further defined with a first side and a second side; wherein the first side is opposite of the second side.

4. The virtual chess table according to claim 3 wherein both the first side and the second side include the touchscreen and the joystick.

5. The virtual chess table according to claim 4 wherein the table is further defined with a recess that is covered with the glass member.

6. The virtual chess table according to claim 5 wherein the recess includes the image projector that projects said image of the chessboard onto the glass member from underneath the glass member.

7. The virtual chess table according to claim 6 wherein the hologram projector system includes a plurality of hologram projectors that are suspended at various locales around the table.

8. The virtual chess table according to claim 7 wherein the plurality of hologram projectors each emit a laser light that intersects with one another to form a holographic image of said one or more chess piece.

9. The virtual chess table according to claim 8 wherein the hologram projector system and the image projector connect to a computer via wiring.

10. The virtual chess table according to claim 9 wherein the computer is in wired connection via wiring with the touchscreen and the joystick of the first side and the second side of the table.

11. A virtual chess table comprising:
a table that includes an image projector that emits an image of a chessboard onto a glass member;
wherein a virtual projector system is suspended above said table and projects a three-dimensional hologram of one or more chess pieces that are manipulated about said image of said chessboard;
wherein a pair of opposing sides of the table include a joystick and a touchscreen that communicates with a computer to manipulate the three-dimensional hologram of said one or more chess pieces;
wherein the table includes at least one leg that supports the table in a horizontal orientation;
wherein the table is further defined with a first side and a second side; wherein the first side is opposite of the second side;
wherein both the first side and the second side include the touchscreen and the joystick;
wherein the table is further defined with a recess that is covered with the glass member.

12. The virtual chess table according to claim 11 wherein the recess includes the image projector that projects said image of the chessboard onto the glass member from underneath the glass member.

13. The virtual chess table according to claim 12 wherein the hologram projector system includes a plurality of hologram projectors that are suspended at various locales around the table.

14. The virtual chess table according to claim 13 wherein the plurality of hologram projectors each emit a laser light that intersects with one another to form a holographic image of said one or more chess piece.

15. The virtual chess table according to claim 14 wherein the hologram projector system and the image projector connect to a computer via wiring.

16. The virtual chess table according to claim 15 wherein the computer is in wired connection via wiring with the touchscreen and the joystick of the first side and the second side of the table.

* * * * *